(12) United States Patent
Clement et al.

(10) Patent No.: US 10,928,800 B2
(45) Date of Patent: Feb. 23, 2021

(54) DIRECT CLIENT INITIATED CNC TOOL SETTING

(71) Applicant: INOVATECH ENGINEERING CORP., Vankleek Hill (CA)

(72) Inventors: Miguel Clement, St-Pascal (CA); Stephane Menard, Coteau-du-Lac (CA); Dominique Bruneau, Orleans (CA); David Gabriels, Egbert (CA)

(73) Assignee: LINCOLN ELECTRIC COMPANY OF CANADA LP, Toronto (CA)

( * ) Notice: Subject to any disclaimer, the term of this patent is extended or adjusted under 35 U.S.C. 154(b) by 416 days.

(21) Appl. No.: 15/450,189

(22) Filed: Mar. 6, 2017

(65) Prior Publication Data
US 2017/0255183 A1    Sep. 7, 2017

Related U.S. Application Data

(60) Provisional application No. 62/303,600, filed on Mar. 4, 2016.

(51) Int. Cl.
*G05B 19/402* (2006.01)
*B25J 9/16* (2006.01)
(Continued)

(52) U.S. Cl.
CPC .......... *G05B 19/402* (2013.01); *B25J 9/1697* (2013.01); *B25J 11/0055* (2013.01);
(Continued)

(58) Field of Classification Search
CPC ......... G05B 19/402; G05B 2219/39393; B25J 9/1697; B25J 11/0055; B23K 26/702; B23K 26/38; B23K 10/006
See application file for complete search history.

(56) References Cited

U.S. PATENT DOCUMENTS

| 4,725,961 A | * | 2/1988 | Pearl | ........................ | A43D 8/00 |
| | | | | | 700/171 |
| 6,205,370 B1 | * | 3/2001 | Blaimschein | ............ | B26D 5/00 |
| | | | | | 700/134 |

(Continued)

OTHER PUBLICATIONS

Microsoft (Koenigsbauer, Kirk, "New to office in January . . . " [online], retrieved online Apr. 11, 2020, Microsoft, Jan. 21, 2016; url<https://www.microsoft.com/en-us/microsoft-365/blog/2016/01/21/new-to-office-365-in-january-new-inking-tools-collaboration-improvements-office-insider-builds-no) (Year: 2016).*

(Continued)

*Primary Examiner* — James J Lee
*Assistant Examiner* — Shon G Foley

(57) ABSTRACT

Computer numerical control (CNC) machines execute a process automatically unless a condition occurs that triggers one or more alarms that terminate the process. Accordingly, CNC laser cutting post-process inspection is usually nonexistent or minimal. However, with CNC laser welding it is more common for a visual inspection or automated inspection to be performed to verify that the process was completed. Similar issues occur when single piece parts are required in addition to which executing an offline inspection requires additional complexity in re-working any piece part. Accordingly, embodiments of the invention provide enterprises and facilities employing CNC laser cutting/welding systems with a means to overcome these limitations. Further, providing intuitive user interfaces allows the user to perform tasks directly through a touch screen interface they are viewing the work piece/piece-parts upon.

11 Claims, 10 Drawing Sheets

800A

800B

(51) Int. Cl.
*B25J 11/00* (2006.01)
*B23K 26/70* (2014.01)
*B23K 10/00* (2006.01)
*B23K 26/38* (2014.01)

(52) U.S. Cl.
CPC ............ *B23K 10/006* (2013.01); *B23K 26/38* (2013.01); *B23K 26/702* (2015.10); *G05B 2219/39393* (2013.01)

(56) References Cited

U.S. PATENT DOCUMENTS

| | | | | |
|---|---|---|---|---|
| 6,822,652 | B1* | 11/2004 | Browne | G06T 11/40 |
| | | | | 345/467 |
| 9,183,072 | B1* | 11/2015 | Makuch | G06F 11/0709 |
| 2002/0114537 | A1* | 8/2002 | Sutula, Jr. | G05B 19/4099 |
| | | | | 382/285 |
| 2011/0047013 | A1* | 2/2011 | McKenzie, III | G06Q 10/10 |
| | | | | 705/14.4 |
| 2016/0210602 | A1* | 7/2016 | Siddique | G06Q 20/0453 |
| 2016/0363922 | A1* | 12/2016 | Fagan | B23K 10/00 |
| 2016/0370791 | A1* | 12/2016 | Revanur | B33Y 50/02 |

OTHER PUBLICATIONS

Berard (Berard, Francois "The Magic Table: Computer-Vision Based Augmentation of a whiteboard for Creative Meetings", In: Proceedings of IEEE international conference in computer vision, Nice, France, 2003) (Year: 2003).*

* cited by examiner

DIRECT CLIENT INITIATED CNC TOOL SETTING

REFERENCE TO RELATED APPLICATION

This application is based on Provisional Application Ser. No. 62/303,600, filed 4 Mar. 2016, currently pending.

FIELD OF THE INVENTION

This invention relates to machine tool settings and more particularly to the provisioning of tool instructions directly through a touch screen interface displaying a work piece.

BACKGROUND OF THE INVENTION

Numerical control (NC) is the automation of machine tools that are operated by precisely programmed commands encoded on a storage medium, as opposed to controlled manually via hand wheels or levers, or mechanically automated via cams alone. Most NC today is computer (or computerized) numerical control (CNC), in which local and/or remote computers provide the data files for execution by the machine tool(s). CNC systems allow end-to-end component design to highly automated using computer-aided design (CAD) and computer-aided manufacturing (CAM) programs. The programs produce a computer file that is interpreted to extract the commands needed to operate a particular machine via a post processor, and then loaded into the CNC machines for production.

As a particular component might require the use of a number of different tools, e.g. drills, saws, etc., modern machines often combine multiple tools into a single "cell". In other installations, a number of different machines are used with an external controller and human or robotic operators move the component from machine to machine. In either case, the series of steps needed to produce any part is highly automated and produces a part that closely matches the original CAD design.

However, CNC machine(s) whilst relying upon the settings of the machine tool or tools required to achieve a specific action with respect to the piece part requires that these actions are pre-programmed so that the CNC machine (s) performs them automatically without supervision. However, in many instances a single simple piece-part is required requiring programming of the piece-part or multiple piece-parts are required whilst only offcuts of material exist such that each piece must be loaded and executed individually. Accordingly, in these instances it would be beneficial for a user to be able to be able to exploit the CNC machine's vision systems and processing capabilities to perform either task.

Further, CNC machine(s) execute a process automatically unless a condition occurs that triggers one or more alarms that terminate the process. With a process such as CNC laser cutting post-process inspection is usually non-existent or minimal. However, with CNC laser welding it is more common for a visual inspection or automated inspection to be performed to verify that the process was completed. As such similar issues occur when single piece parts are required in addition to which executing an offline inspection requires additional complexity in re-working any piece part.

Accordingly, it would be beneficial to provide enterprises and facilities employing CNC laser cutting/welding systems with a means to overcome these limitations. It would be further beneficial if the systems provided intuitive user interfaces allowing the user to perform tasks directly through a touch screen interface they are viewing the work piece/piece-parts upon.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to machine tool settings and more particularly to the provisioning of tool instructions directly through a touch screen interface displaying a work piece.

In accordance with an embodiment of the invention there is provided a method comprising:
automatically inspecting a piece-part processed by a computer numerical control (CNC) machine once a predetermined process with the CNC machine has been completed comprising re-executing at least one movement of at least one of a platform supporting the piece-part forming a first part of the CNC machine and a tool forming a second part of the CNC machine, wherein
the movement is part of the predetermined process; and
the CNC machine tool captures an image of a plurality of images at least one of during the movement and upon completion of the movement.

In accordance with an embodiment of the invention there is provided a method comprising:
displaying to a user a view of an item either to be subjected to a process or subjected to a process by a computer numerical control (CNC) machine;
receiving from the user an indication of a location for an additional process to be performed on the item through a graphical user interface displaying the view of the item to the user; and
upon receiving the indication for a process to be performed adding the location to the processing sequence to be performed; and
upon receiving the indication once the item has been subjected to the process performing an addition process at indicated location.

In accordance with an embodiment of the invention there is provided a method comprising:
displaying to a user a view of an item either to be subjected to a process or subjected to a process by a computer numerical control (CNC) machine;
receiving from the user an indication of a location and an element generated from the item through a graphical user interface displaying the view of the item to the user; and
upon receiving the indication in relation to the item prior to its being subjected to a process to be performed adding the location and element to the processing sequence to be performed; and
upon receiving the indication in relation to the item once it has been subjected to a process moving the item to the location indicated and generating the element.

In accordance with an embodiment of the invention there is provided a method comprising:
displaying to a user a view of an item either to be subjected to a process or subjected to a process by a computer numerical control (CNC) machine;
presenting to the user a list of available elements that would fit within a portion of the item not associated with a structure associated with the process;

receiving from the user an indication of a selected element from the list of available elements through a graphical user interface displaying the view of the item to the user and the list of available elements; and upon receiving the indication in relation to the item prior to its being subjected to a process to be performed adding the selected element to the processing sequence to be performed; and upon receiving the indication in relation to the item once it has been subjected to a process moving the item to the portion of the item not associated with a structure associated with the process and performing an additional process in dependence upon the selected element.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
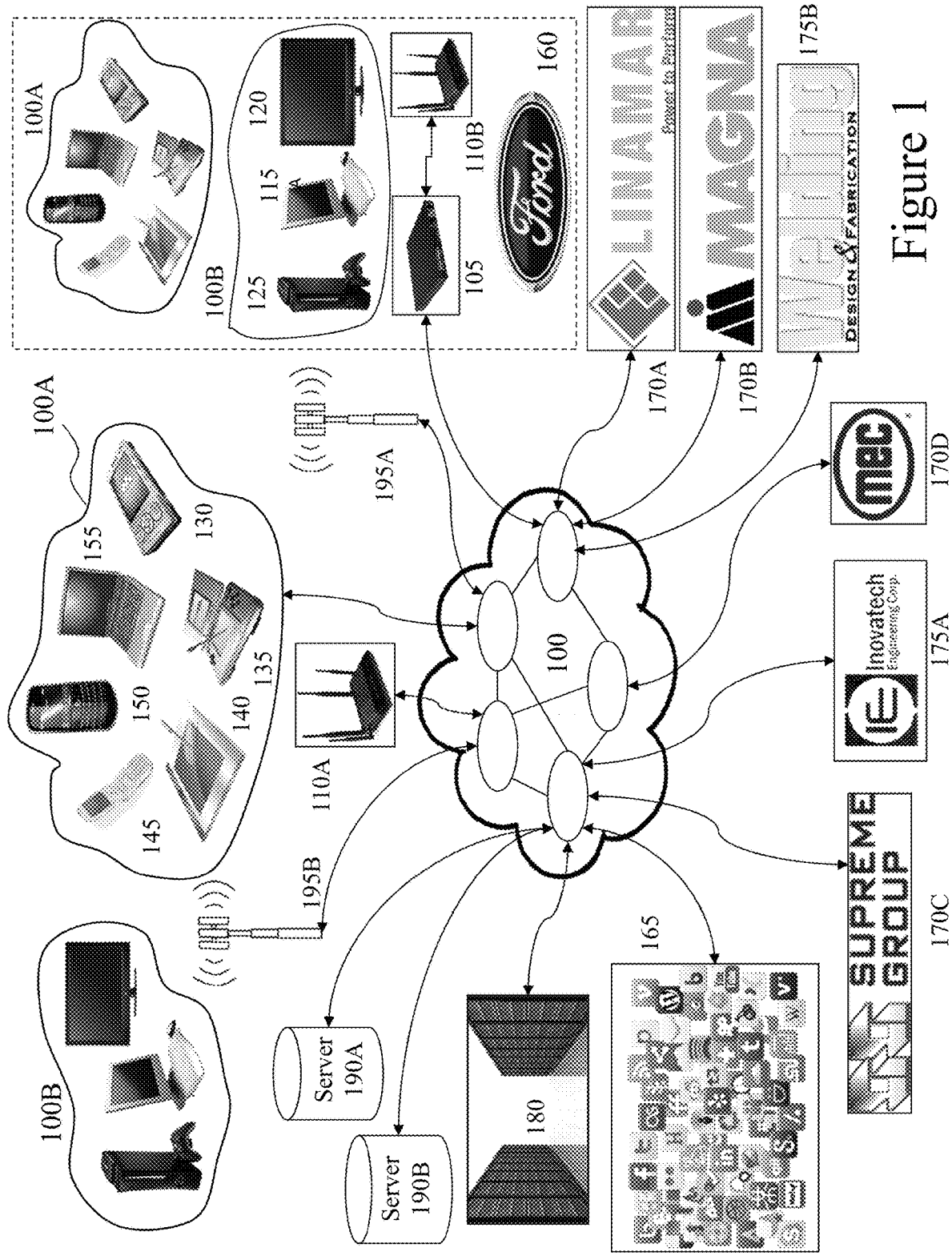
FIG. 1 depicts a network environment within which embodiments of the invention may be employed.

The present invention is directed to machine tool settings and more particularly to the provisioning of tool instructions directly through a touch screen interface displaying a work piece.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "machine tool" (tool) as used herein, and throughout this disclosure, refers to a machine for shaping or machining or assembling metal or other rigid materials, usually by cutting, boring, drilling, grinding, shearing, or other forms of deformation in conjunction with welding, brazing and other forms of material joining. Machine tools employ some sort of tool that does the cutting or shaping which may be fixed or removable/changeable. Machine tools generally have some means of constraining the workpiece and/or providing a guided movement of the parts of the machine and workpiece. Thus the relative movement between the workpiece and the cutting tool (which is called the toolpath) is controlled or constrained by the machine to at least some extent. Some machine tools may work on a single piece part at a time whilst others may work on multiple piece parts or generate multiple piece parts from a single piece of starting stock material. Some machine tools may only provide a single process, e.g. drilling, whilst other tools such as milling machines may provide multiple processes. Such machine tools may include, but not be limited to, drill presses, lathes, screw machines, milling machines, shears, saws, planers, grinding machines, electrical discharge machining, plasma cutters, laser cutters, laser engravers, grinders, electrical discharge welders, shot peening, and water jet cutters/surface machining.

A "profile" as used herein, and throughout this disclosure, refers to a computer and/or microprocessor readable data file comprising data relating to settings and/or limits and/or sequence for a machine tool or other item of manufacturing equipment.

Referring to FIG. 1 there is depicted a network environment 100 within which embodiments of the invention may be employed supporting machine tool systems, applications, and platforms (MTSAPs) according to embodiments of the invention. Such MTSAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, such as Ford™ for example, within which other first and second user groups 100A and 100B are disposed. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, first manufacturer 170A, e.g. Linamar™; second manufacturer 170B, e.g. Magna™; steel fabricator 170C, e.g. Supreme Group™; manufacturing solutions provider 170D, e.g. Mayville Engineering Corp.; machine tool manufacturer 175A, e.g. Inovatech Engineering; and online chat/discussion/bulletin board/forum 175B, e.g. Welding Design and Fabrication (http://weldingweb.com/); as well as first and second servers 190A and 190B which together with others, not shown for clarity. Accordingly, a user employing one or more MTSAPs may interact with one or more such providers, enterprises, service providers, retailers, third parties etc. and other users. First and second servers 190A and 190B may host according to embodiments of the inventions multiple services associated with a provider of adult device systems, applications, and platforms (MTSAPs); a provider of a SOCNET or Social Media (SOME) exploiting MTSAP features; a provider of a SOCNET and/or SOME not exploiting MTSAP features; a provider of services to PEDS and/or FEDS; a provider of one or more aspects of wired and/or wireless communications; an Enterprise 160 exploiting MTSAP features; license databases; content databases; image databases; content libraries; customer databases; websites; and software applications for download to or access by FEDs and/or PEDs exploiting and/or hosting MTSAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides MTSAP features according to embodiments of the invention; execute an application already installed providing MTSAP features; execute a web based application providing MTSAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
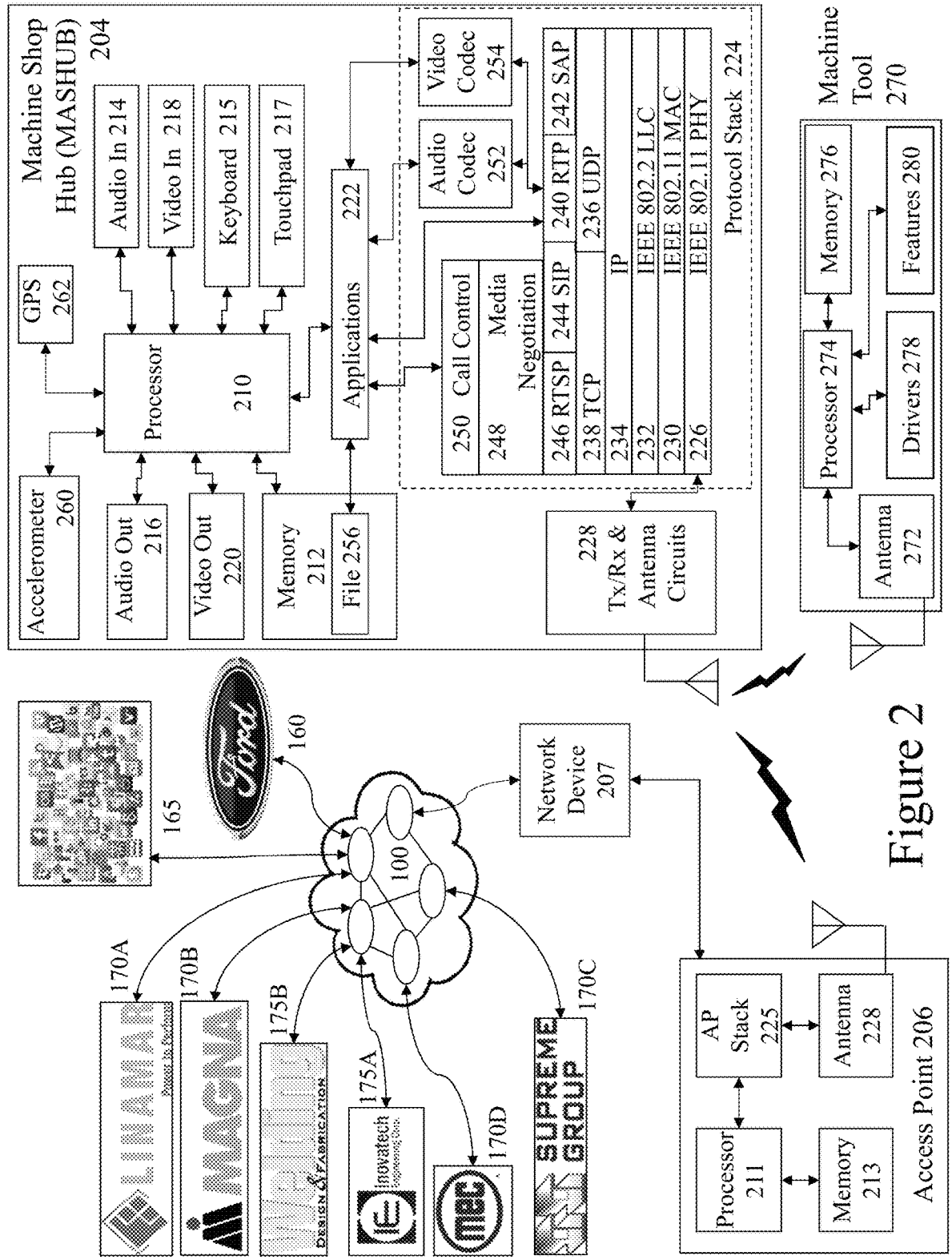
FIG. 2 depicts a machine shop hub supporting communications to a network such as depicted in FIG. 1 and as supporting embodiments of the invention with respect to machine tool settings and profiles.

Now referring to FIG. 2 there is depicted a Machine Shop Hub (MASHUB) 204 and network access point 207 supporting MTSAP features according to embodiments of the invention. MASHUB 204 may, for example, be a PED and/or FED and may include additional elements above and beyond those described and depicted. Also depicted within the MASHUB 204 is the protocol architecture as part of a simplified functional diagram of a system 200 that includes an MASHUB 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, first manufacturer 170A, e.g. Linamar™; second manufacturer 170B, e.g. Magna™; steel fabricator 170C, e.g. Supreme Group™; manufacturing solutions provider 170D, e.g. Mayville Engineering Corp.; machine tool manufacturer 175A, e.g. Inovatech Engineering; and online chat/discussion/bulletin board/forum 175B, e.g. Welding Design and Fabrication (http://weldingweb.com/); as well as first and second servers 190A and 190B and Enterprise 160, Ford™.

The MASHUB 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

MASHUB 204 may include an audio input element 214, for example a microphone, and an audio output element 216, for example, a speaker, coupled to any of processors 210. MASHUB 204 may include a video input element 218, for example, a video camera or camera, and a video output element 220, for example an LCD display, coupled to any of processors 210. MASHUB 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the MASHUB 204. The one or more applications 222 that are typically stored in memory 212 and are executable by any combination of processors 210. MASHUB 204 also includes accelerometer 260 providing three-dimensional motion input to the process 210 and GPS 262 which provides geographical location information to processor 210.

MASHUB 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Tx/Rx & Antenna Circuits 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206.

Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230. It would be apparent to one skilled in the art that elements of the MASHUB 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232.

The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed MASHUBs represented by MASHUB 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted is Machine Tool (MACTO) 270 which is coupled to the MASHUB 204 through a wireless interface between Antenna 272 and Tx/Rx & Antenna Circuits 228 wherein the MASHUB 204 may support, for example, a national wireless standard such as GSM together with one or more local and/or personal area wireless protocols such as IEEE 802.11 a/b/g WiFi, IEEE 802.16 WiMAX, and IEEE 802.15 Bluetooth for example. The Antenna 272 is connected to Processor 274 and therein to Memory 276, Drivers 278, and Features 280. Accordingly, the MACTO 270 may operate as standalone device with factory installed control routines accessed through an interface on the MACTO 270, not shown for clarity, or through an application in execution upon the MASHUB 204. Subsequently, as described below one or more of these control routines may be modified, amended, deleted etc. whilst other new control routines may be created, acquired, installed etc.

Accordingly, it would be evident to one skilled the art that the MACTO 270 with associated MASHUB 204 may accordingly download original software and/or revisions for a variety of functions supported by the drivers 278 and/or features 280. In some embodiments of the invention the functions may not be implemented within the original as sold MACTO 270 and are only activated through a software/firmware revision and/or upgrade either discretely or in combination with a subscription or subscription upgrade for example. Whilst the MASHUB 204, MACTO 270 and AP 206 are depicted exploiting wireless communications it would be evident that in other embodiments of the invention one or more of these wireless communication paths may be replaced with a wired connection or a non-wireless but unwired connection such as an optical link for example or not implemented and communications are through the AP 206 for example between MACTO 270 and MASHUB 204 or even via the network 100.

Figure 3:
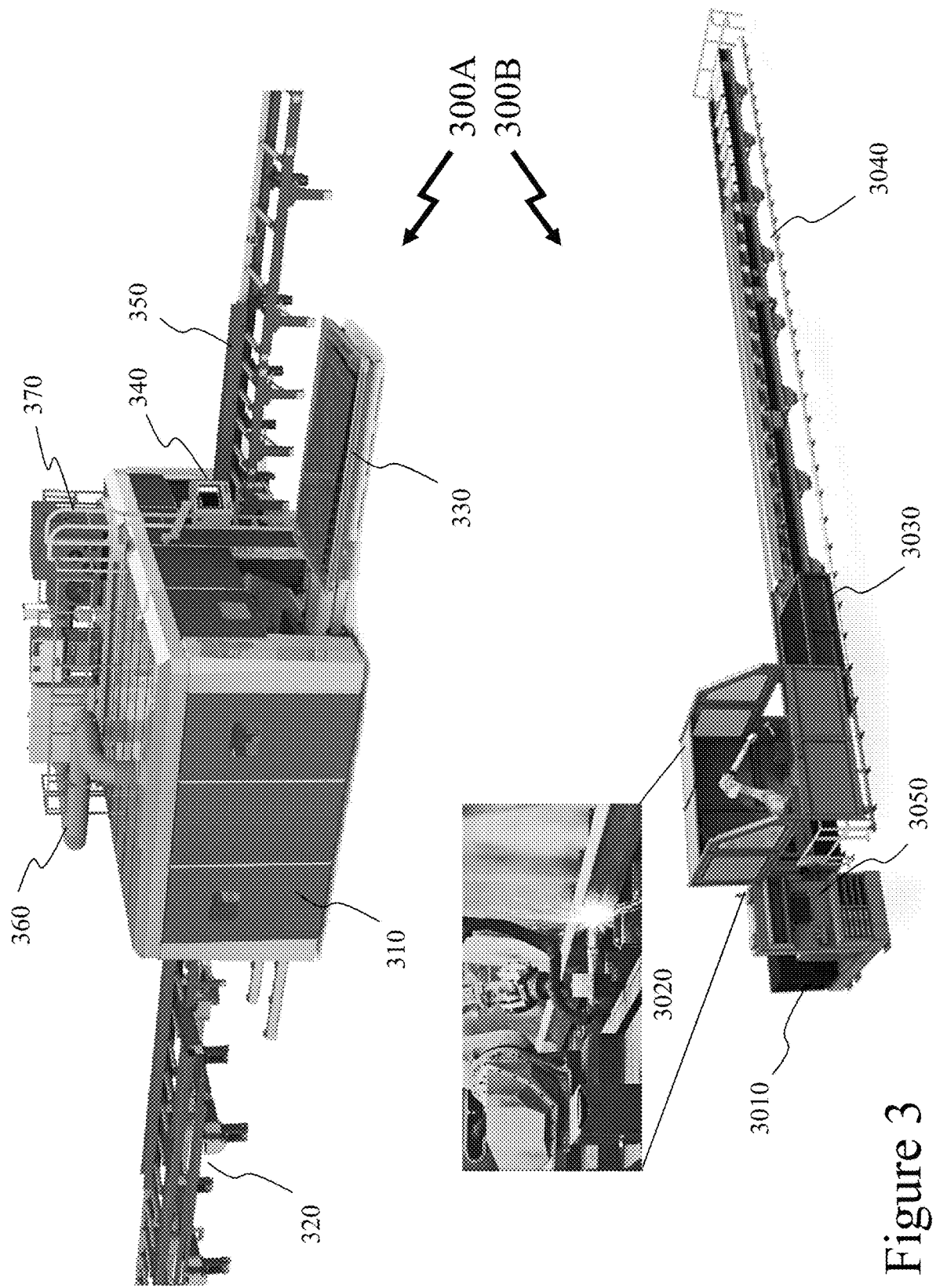
FIG. 3 depicts exemplary plasma cutting machine tool systems generating and exploiting configuration settings established and verified according to embodiments of the invention.

Now referring to FIG. 3 there are depicted first and second schematics 300A and 300B of plasma cutting machine tool systems as manufactured by Inovatech Engineering which may generate and exploit machine tool settings/configuration profiles as established, verified, and acquired according to embodiments of the invention. Accordingly, each of the plasma cutting machine tool systems in first and second schematics 300A and 300B may be an example of a MACTO 270 in FIG. 2. Considering initially first schematic 300A then:

Robot enclosure 310, provides an environment containing fumes, reducing noise etc.;
Cross-transfer 320, allows different load/unload profiles to be employed as well as materials receipt/processed material delivery, etc. and saves time;

Plate table 330, provides base for sheet/plate as moved relative to plasma cutter where typical configurations include 6"×10" (2 m×3 m), 12'×10' (4 m×3 m), and 24'×10" (8 m×3 m);

Operator station 340, wherein an industrial computer controls plasma robot, conveyors, plate table, etc. and displays messages, alarms, maintenance screens, plasma control settings etc.;

Infeed/outfeed conveyors 350; chain or belt driven conveyors allow material to be received from stock/prior MACTO 270 and/or transferred to finished stock/next MACTO 270.

Ventilation system 360, which provides automatic fume extraction and filtering etc.; and Plasma gas control etc. 370, with automated gas control etc. for different cutting processes adapted to plasma cutter head, material processed, etc.

Now referring to second schematic 300B then:

Plasma gas control etc. 3010, with automated gas control etc. for different cutting processes adapted to plasma cutter head, material processed, etc.

6-axis robot 3020, with plasma cutter head allowing control over head position, orientation and movement of plasma cutter head relative to the piece part independent of any motion of the piece part which as depicted is within an enclosure that moves along the profile table 3040 reducing overall space requirements;

Water 3030, optionally inserted in line for quenching, cutting stiffener plates, etc.;

Profile table 3040 which supports the piece-part(s) and allows for laser piece-part scanning and alignment of the piece-part on the profile table; and Operator station 3050, wherein an industrial computer controls plasma robot, conveyors, plate table, etc. and displays messages, alarms, maintenance screens, plasma control settings etc.

Accordingly, the operator stations 340 and 3050 in first and second schematics 300A and 300B (hereinafter operator station), acting for example as MACTO 270 with optional communications to a central machine shop system, e.g. MASHUB 204, or acting a MASHUB 204 in a stand-alone configuration provides the required control settings to the computer controlled elements of the plasma cutting machine tool system such as robot (not shown for clarity), plasma cutting tool, and plate table for example. These may be selected from a menu of control setting profiles defined, for example, by product name/product serial number etc. stored upon the operator station or alternatively the operator station retrieves the control setting profile from a remote system such as MASHUB 204. Accordingly, when the operator triggers execution of a machine tool profile (MACPRO) that defines the control settings of the plasma cutting system, in this instance although it would be evident that the MACTO 270 may be any other machine tool accepting computer numerical control (CNC) etc., together with the motion sequence of the robot and plate table as well as in other instances cross-transfer 320, infeed/outfeed conveyors 350, profile table 3050, etc.

Laser welding systems operate through conduction welding or penetration laser welding. Conduction welding is performed at lower energy levels resulting in a wide and shallow weld nugget through either direct heating or absorption. In direct heat welding the heat flow within the work piece is governed by classical thermal conduction from the surface heat of the absorbed laser such that the weld is made by melting portions of the base material. This can be performed on a wide range of alloys and metals. In absorption welding energy is absorbed through inter-facial absorption wherein an absorbing ink is placed at the interface of a lap joint which absorbs the laser beam energy. This is then conducted into a limited thickness of the surrounding material to form a molten inter-facial film that solidifies as the welded joint. Butt welds can be made by directing the energy towards the joint line at an angle through material at one side of the joint, or from one end if the material is highly transmissive.

In contrast conduction-penetration welding occurs at medium energy density and results in further penetration of the weld into the material. Finally, keyhole mode welding creates a deep narrow weld within the material as the laser forms a filament of vaporized material known as a "keyhole" that extends into the material and provides a conduit for the laser energy to be efficiently delivered into the material. This direct delivery of energy into the material does not rely on conduction to achieve penetration, so it minimizes the heat into the material and reduces the heat affected zone.

Figure 4:
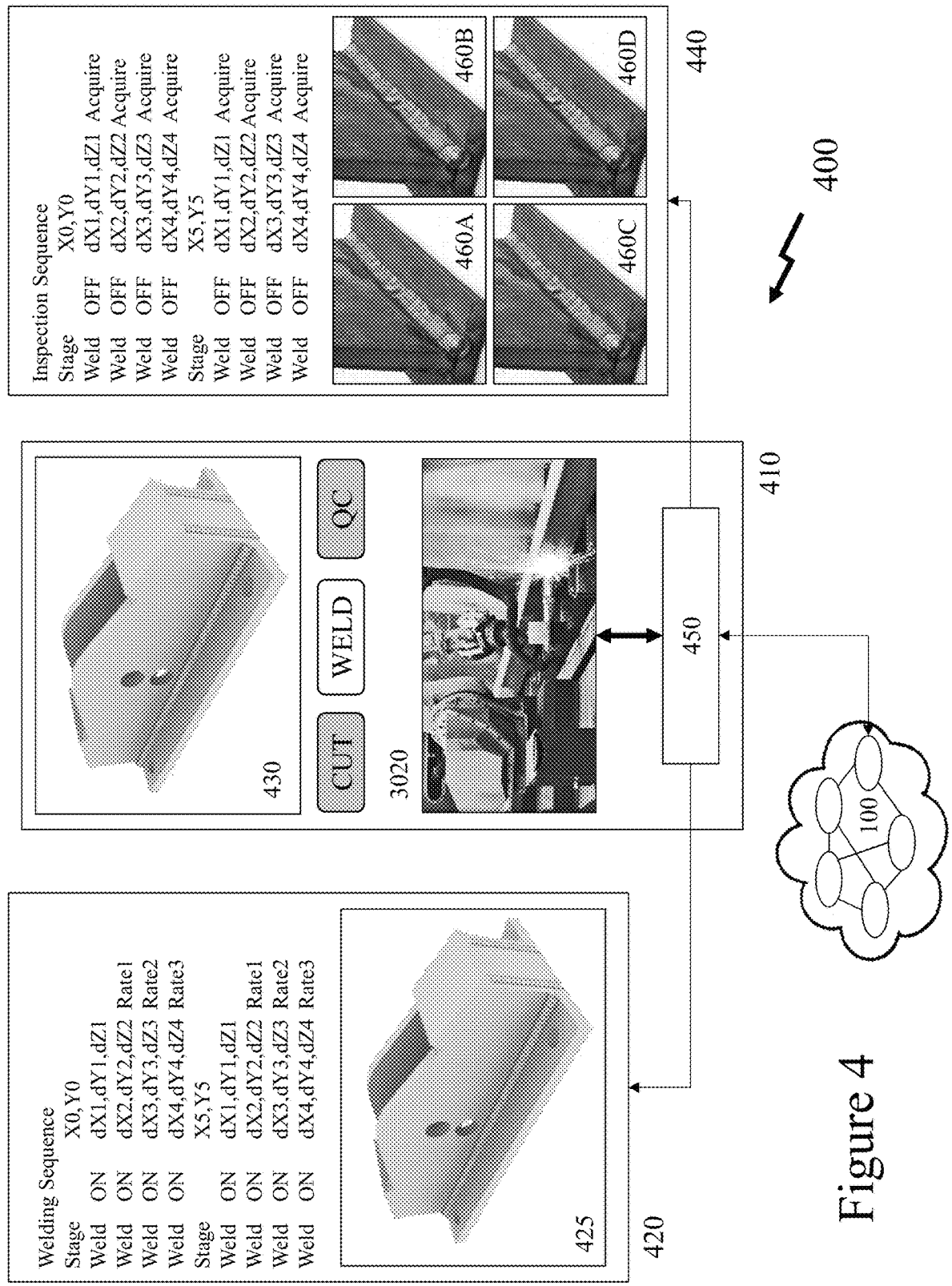
FIG. 4 depicts a schematic diagram of a welding-inspection sequence upon a CNC laser welding system according to an embodiment of the invention.

Referring to FIG. 4 there is depicted a schematic diagram 400 of a welding-inspection sequence upon a CNC laser welding system 410 according to an embodiment of the invention. As depicted the CNC laser welding system (CNC-LWS) 410 incorporates a 6-axis robot (6AX-R) 3020 coupled to a computer 450 and therein to the network 100. Accordingly, the user has selected to weld a piece-part 430 wherein the 6AX-R 3020 in conjunction with the table/platform upon which the piece-part 430 is mounted. Accordingly, in process 420 the CNC-LWS 410 executes the sequence of stage and welding movements as the laser welds the components 425 to form the piece-part 430. Subsequently, the CNC-LWS 410 executes an inspection sequence 440, quality control (QC), wherein the stage and welding movements are repeated but now the system directs its camera to acquire images of the welds which are depicted in first to fourth images 460A to 460D. These images may then be stored within a database in association with an identifier of the piece-part, which may be uniquely generated by the CNC-LWS 410 and cut into it during the welding process. These images and processing data for the piece-part may be locally stored or remotely stored on a remote server connected to the network 100.

Figure 5:
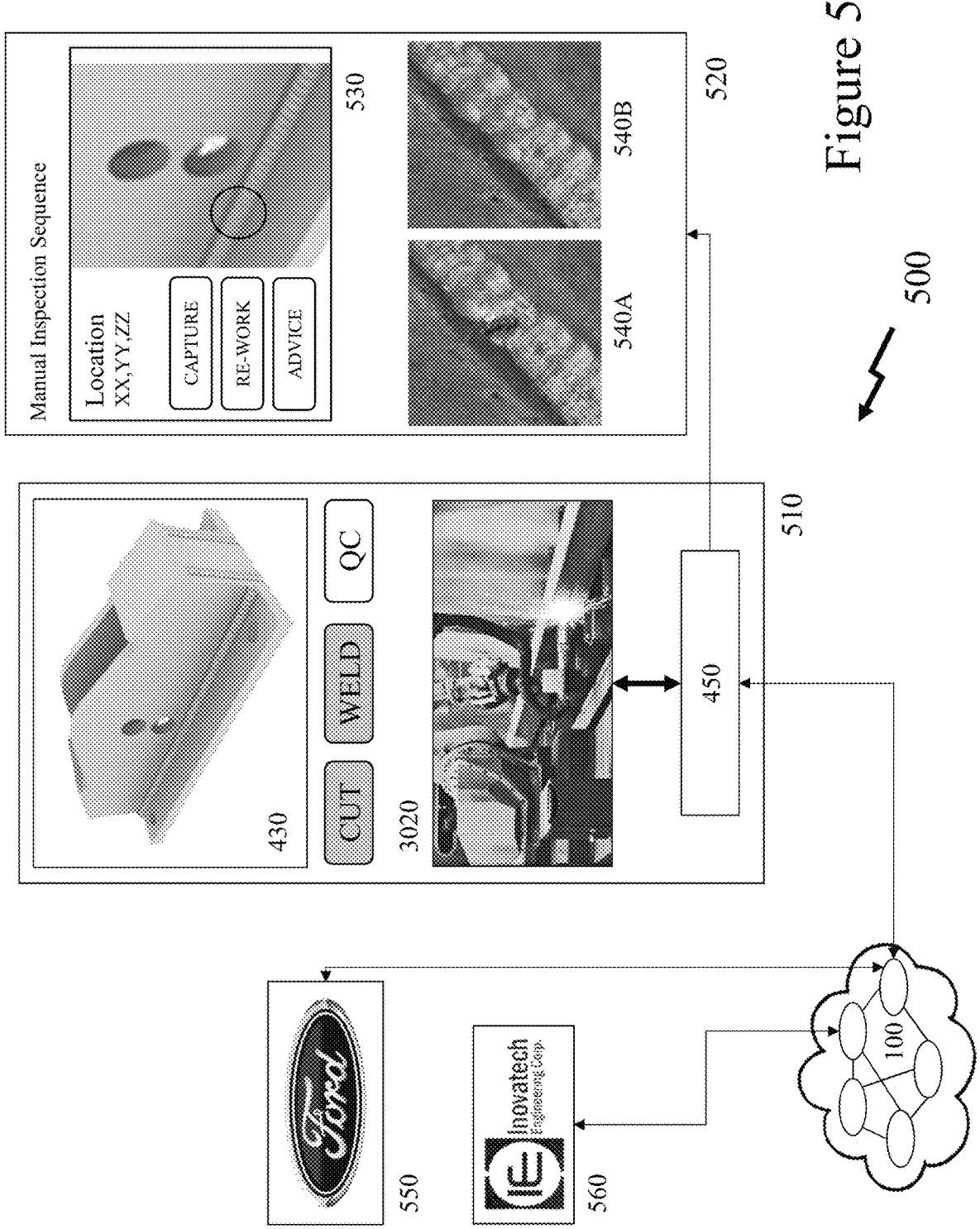
FIG. 5 depicts a schematic diagram of a welding-inspection sequence upon a CNC laser welding system according to an embodiment of the invention with third party interface.

Alternatively, as depicted in FIG. 5 in schematic diagram 500 of a welding-inspection sequence upon a CNC-LWS 510 according to an embodiment of the invention with third party interfaces to manufacturer 550, e.g. Ford™, and CNC-LWS manufacturer 560, e.g. Inovatech Engineering Corp. During a QC process 520 similar to that described and depicted in respect of inspection sequence 440 a defective weld is detected in first image 540A wherein the user has captured the image during a manual inspection sequence as the piece-part is traversed by the 6AX-R 3020 and the camera attached to it. Optionally, the images may have been automatically captured during inspection sequence 440 wherein the images have been image processed allowing determination of defects. Accordingly, the user may select a re-work option within the menu presented to the user on the CNC-LWS 510 wherein a subsequent image 540B is captured.

Optionally, the originally acquired images of the weld(s) may be transmitted to either the manufacturer 550 as the consumer of the piece-part who may accept or reject the part wherein a rejection triggers the re-work of the piece-part. Optionally, the user may select an advice option that transmits data relating to the weld(s) to the CNC-LWS manufacturer 560 wherein they may provide data to the user allowing them to re-work the piece-part and/or adjust the settings of the CNC-LWS 510. Optionally, the advice option may push data relating to the piece-part materials, processing parameters, images etc. to a CNC-LWS user community or alternatively the user may be part of an online community wherein enhancements to processes are submitted by users for verification by the CNC-LWS manufacturer 560, wherein these are then pushed to users as part of upgraded operating processes. Accordingly, the methodologies and concepts described by the inventors within U.S. Provisional Patent Application 62/218,611 entitled "Client Initiated Vendor Verified Tool Setting" filed Sep. 15, 2015 may be employed and/or extended to include requests for advice, requests for settings etc.

Optionally, the user may be presented with images acquired of the piece-part and through indication of one or more locations on the piece-part additional welds may be added to those already implemented on the piece-part. Optionally, the user may be presented with images associated with the piece-part to be welded together with indications of welds to be performed wherein the user may through indication of one or more locations add additional welds to the process to be performed.

Figure 6:
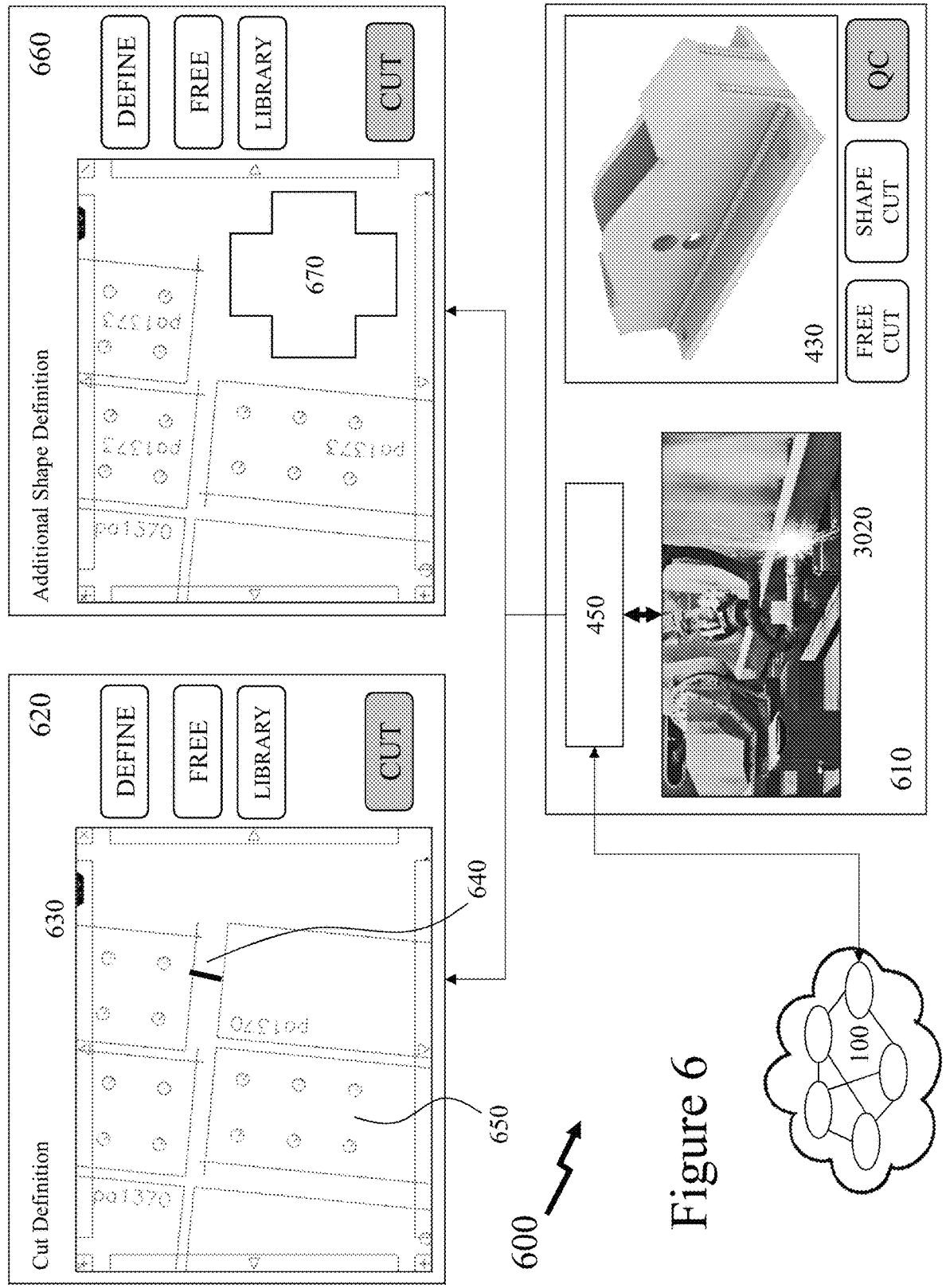
FIG. 6 depicts a schematic diagram of an intuitive user interface for a user to perform one-off processes with a CNC laser cutting system according to an embodiment of the invention.

Now referring to FIG. 6 there is depicted a schematic diagram 600 of an intuitive user interface for a user to perform one-off processes with a CNC plasma cutting system according to an embodiment of the invention. As depicted a CNC plasma cutting system (CNC-PCS) 610 is depicted comprising a controller 450 in conjunction with a 6AX-R 3020 and other elements such as depicted in respect of FIG. 3 in respect of first and second schematics 300A and 300B. Accordingly, the user is performing a cut yielding first configuration screen 620 if they select to define a cut (select "Free Cut") and second configuration screen 660 if they select additional shape definition (select "Shape Cut"). In first configuration screen 620 the user is presented an image of the CNC-PCS 610 table in its current position relative to the 6X-R 3020. Upon the image are displayed outlines 650 of piece parts either previously cut or about to be cut from the sheet within the CNC-PCS 610. The user can now through selecting the "Define" button draw an additional cut 640 which is either executed at that point if the parts defined by the outlines 650 have already been cut or it is added to the cutting sequence for execution once the outlines 650 are processed during the cutting sequence to be executed.

In second configuration 660 the user is similarly presented with an image within which are displayed outlines 650 of piece parts either previously cut or about to be cut from the sheet within the CNC-PCS 610. The user is then able through "Free" or "Library" to define an additional element 670 to be cut from the sheet. In "Free" the user can draw freehand a piece part with or without a guide grid to which their motions may or may not be snapped. Alternatively, in "Library" they may select a piece-part from a list of piece-parts which once selected may be translated and/or rotated to provide a suitable fit to the offcut or remaining portion wherein if confirmed, through a subsequent menu or pop-up menu not depicted for clarity, is then either cut at that point or it is added to the cutting sequence for execution once the outlines 650 are processed during the cutting sequence to be executed. Optionally, the CNC-PCS 610 may, through knowledge of the camera system, 6AX-R 3020 position etc. calculate the dimensions of the field of view and therefrom define dimensions of the off-cut or unassigned portion of the sheet to be cut. Based upon these the piece-parts listed to the user may be pre-filtered for the available footprint of the sheet. They may also be filtered based upon other characteristics of the sheet being cut such as material and thickness that are associated with the piece-parts such that only those matching the currently loaded material/thickness etc. are displayed to the user. In the event that the user loads an offcut without any associated cutting sequence of other parts then the system upon detecting this event requests that the user provide this data either as part of an earlier processing step or in conjunction with these steps.

Figure 7:
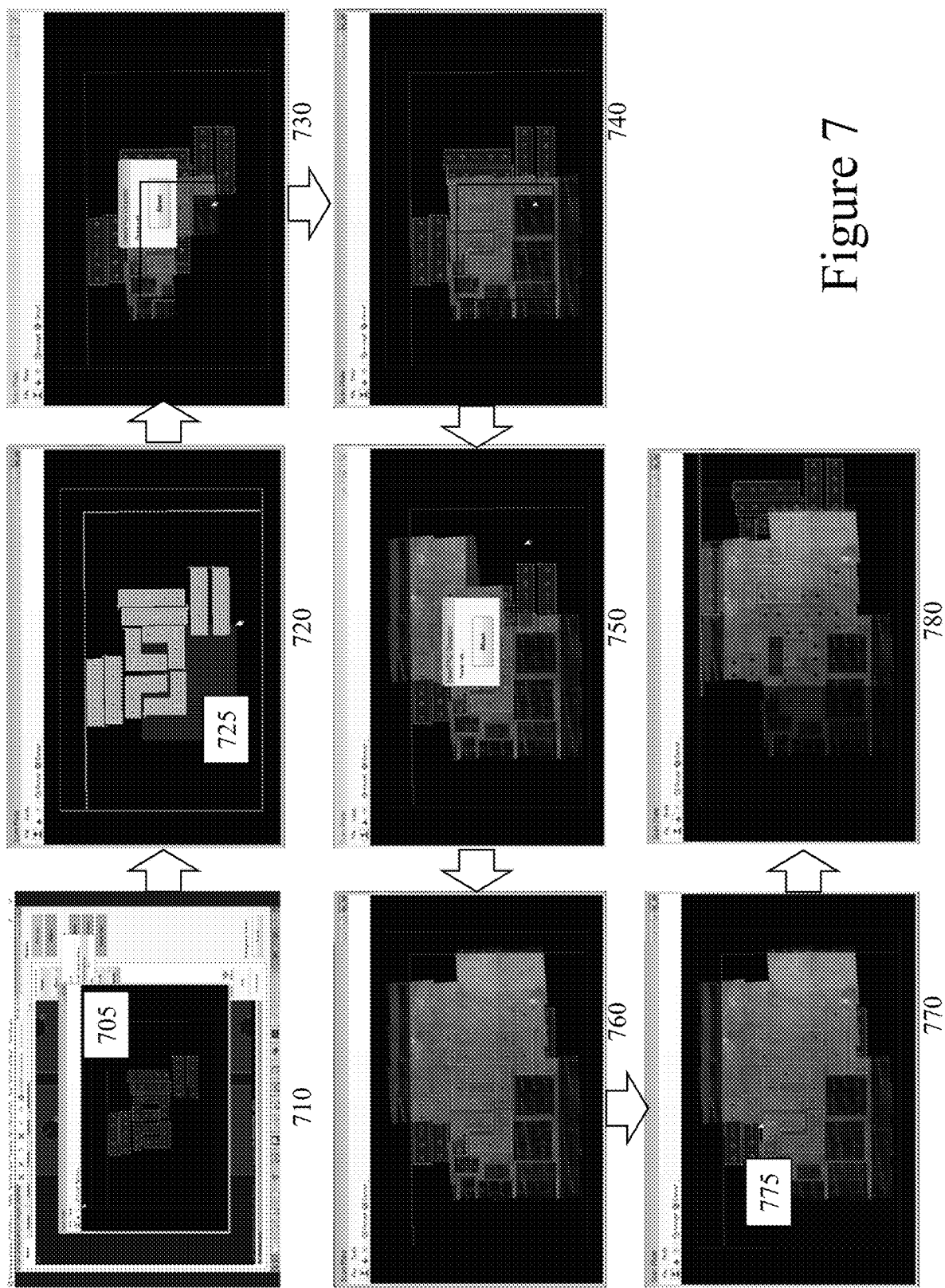
FIG. 7 depicts schematically an image inspection stitching sequence for a CNC laser cutting system according to an embodiment of the invention.

Now referring to FIG. 7 there are depicted first to eighth images 710 to 780 in respect of an image inspection stitching sequence for a CNC laser cutting system according to an embodiment of the invention. Within the preceding description with respect to FIGS. 4 to 6 the CNC laser cutting system according to an embodiment of the invention presents the user with image data relating to the piece part being processed and/or processed as well as computer generated piece-part overlay(s). However, it would be evident that these images may represent only a portion of the work piece and/or the CNC laser cutting project. Accordingly, first to eighth images 710 to 780 depict:

First image 710 depicts a work project overlay 705 to CNC laser cutting application in execution upon the CNC laser cutting system;

Second image 720 depicts the work project overlay indicating the piece-parts within the current work project together with region 725 which the user has identified which is then imaged in a series of steps;

Third image 730 depicts the work project overlay together with the first four acquired images from the CNC laser cutting system camera that are stitched together in order to generate the overall image as the camera does not in combination with the cutting robot provide the ability to image the entire work piece and/or the entire work project within the work piece;

Fourth image 740 depicts the acquired stitched images once completed for the region 725;

Fifth and sixth image 750 and 760 depict the extension of the acquired images and their stitching to the fourth image 740 as the user has established a command sequence for extended imaging;

Seventh image 770 depicts the acquired stitched image together with the work project overlay but also that the user has selected a specific element 775 within the work project overlay' and Eighth image 780 wherein the user is moving the work project overlay relative to the acquired stitched image of the work piece such that the user can establish a work piece/work project overlay allowing a piece-part or piece-parts to be processed (cut) from the work piece.

Accordingly, the system establishes an automatically stitched image of the work piece against which a user can manipulate a work piece overlay allowing a piece-part or piece-parts to be cut from a work piece without an extensive complex set-up process. Accordingly, by exploiting an image stitching process for the robot camera not only can multiple piece-parts be placed and orientated against a work piece but large piece-part(s) and work pieces can be visualized without the limitation that the entire work piece and/or piece-part fit within the field of view of the robotic camera. Within embodiments of the invention the robotic camera may be the same camera as visualizes during the CNC machine processes or it may alternatively be a second camera with different optical characteristics referenced to the CNC robot or to the CNC system overall.

Figure 8:
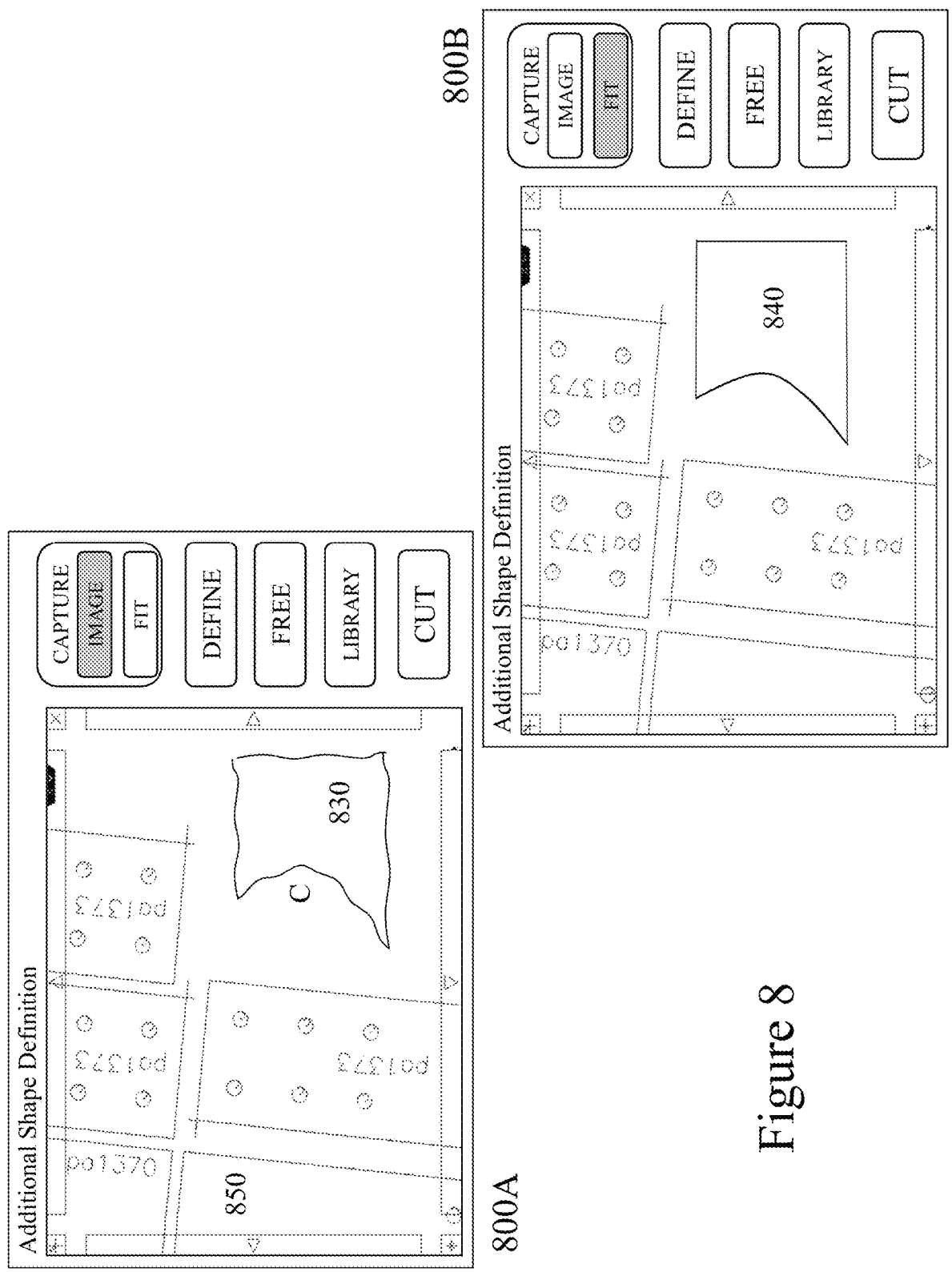
FIG. 8 depicts schematic images of an intuitive user interface for a user to perform one-off processes with a CNC laser cutting system according to an embodiment of the invention.

Now referring to FIG. 8 there are depicted first and second screenshots 800A and 800B of an intuitive user interface for a user to perform one-off processes with a CNC laser cutting system according to an embodiment of the invention. As discussed supra in respect of FIG. 6 a user may exploit a touch-screen interface to perform one-off processing such as cutting a piece from a sheet, adding a weld, etc. As depicted in FIG. 6 in first configuration screen 620 the user can define a cut through the touch-screen (by selecting "Free Cut") and in second configuration screen 660 they can select predetermined shapes (by selecting "Shape Cut") which they can manipulate and add to, e.g. adding holes, slots, etc. However, it would be evident that the user may use a different haptic interface other than the touch screen of the machine such as a keyboard, computer mouse, etc. or a touch screen and/or another haptic interface interfaced to the machine directly or subsequently. Hence, a user may be standing away from the machine using a stylus on a tablet PC wirelessly connected to the machine to draw the piece-part where the image on the machine screen is also presented to the user on the other electronic device.

However, alternatively, the user may directly mark the workpiece with a marking material, e.g. chalk, ink, paint, etc. that is captured by the machine's imaging system and processed to generate the instructions for the machine. Accordingly, in first image 800A the display is depicted in image acquisition mode wherein the work piece 850 is depicted with traces for previously cut or to be cut piece-parts. Accordingly, there is depicted an outline 830 comprised of freehand marked lines 820 and a curve 810, the curve including an indicator 815 also marked by the user. Subsequently, as depicted in second image 800B the machine processes the outline 830 to generate profile 840 wherein the freehand lines 810 are replaced with fitted lines based upon each individual line and the overall combination of lines marked and the curve 810 generated based upon association of the indicator 815 with the curve 810 as otherwise the image processing may replace it with straight line segments. Whilst the indicator 815 is depicted as a "C" it would be evident that other markings may be employed, e.g. "▲", to indicate that the freehand element is of a specific type. It would be evident that a range of standard markings may be established to indicate specific functions and that these may vary according to the function of the CNC system such that markings for a laser or plasma cutting system are different to those of a welding system or a drill press.

Within other embodiments of the invention in order to avoid other markings make to work pieces being interpreted, e.g. chalk markings made as part of stock management, inventory control, previous processing etc., that the CNC system may interpret markings of a specific colour, e.g. yellow or red versus white. The CNC system may provide a colour for the work piece to be marked in or the user enters it based upon colours available that are different to any markings already on the work piece. Other colours may be ignored irrespective of user selection so that confusion with aspect of the work piece are considered based upon a material selection as part of the overall process. For example, steel may mean red/orange are ignored automatically so that rust does not impact the determination of cut lines for example or placement of holes etc. Similarly, cutting blue anodized aluminum means all blue-green colours are ignored. Other variants and variations may be considered. For marking large work pieces, the CNC system may interpret a series of discrete lines with or without associated indicators as a continuous line.

Optionally, a template of the piece-part to be cut may exist, e.g. from a previous processing, from a template provided, etc. For example, a wooden or plastic template may have been formed by a customer at a worksite. Accordingly, its image may be captured upon the work-piece or discretely, processed, and then the pattern employed upon the CNC machine.

Figure 9A:
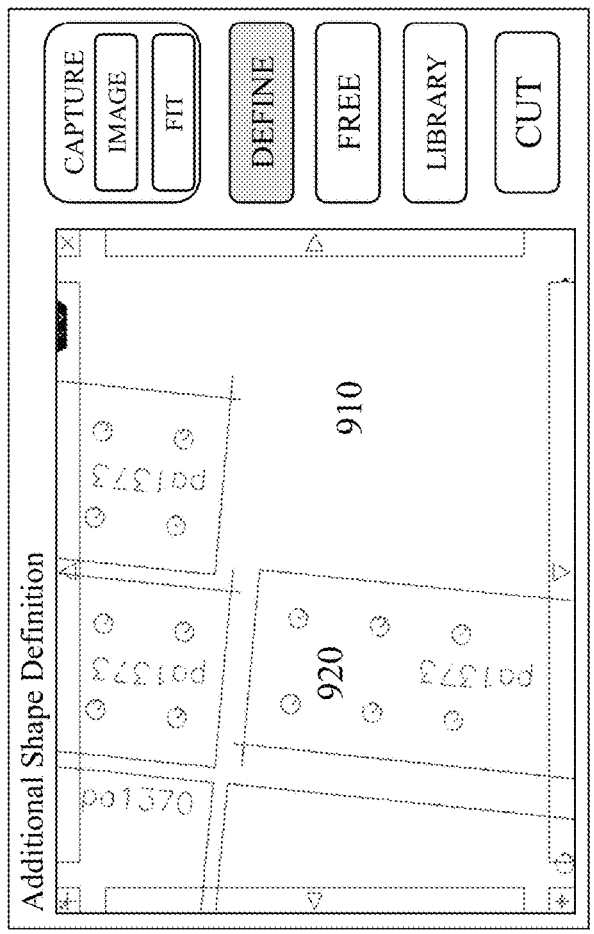
FIGS. 9A and 9B depict schematic images of an intuitive user interface for a user to perform part selection and manipulation for one-off processes with a CNC laser cutting system according to an embodiment of the invention.
Figure 9A:
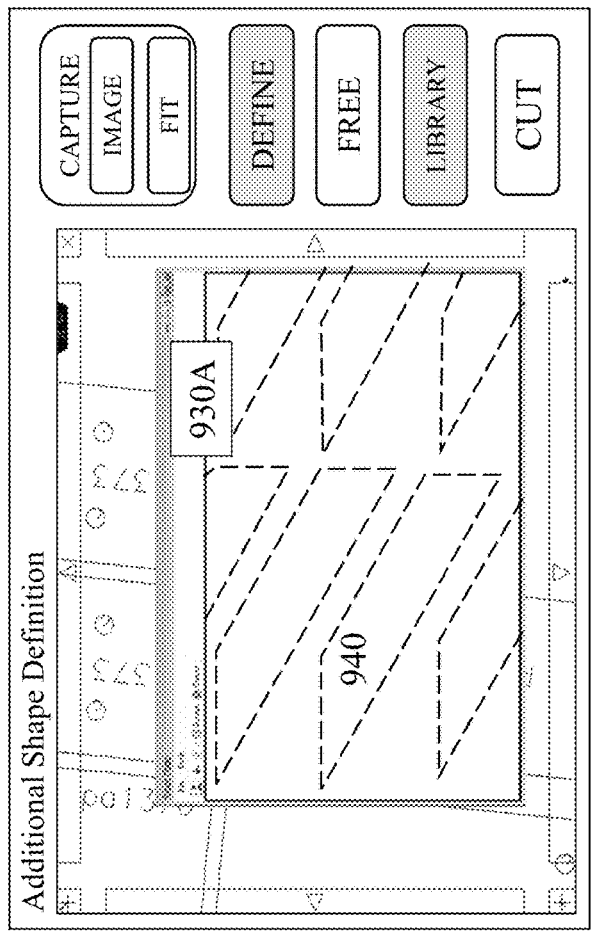
Figure 9B:
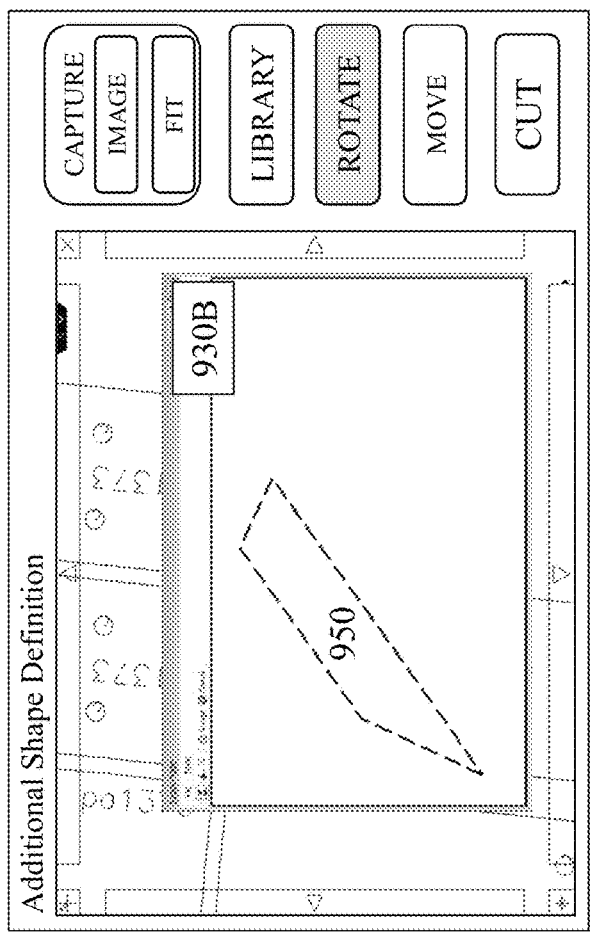
Figure 9B:
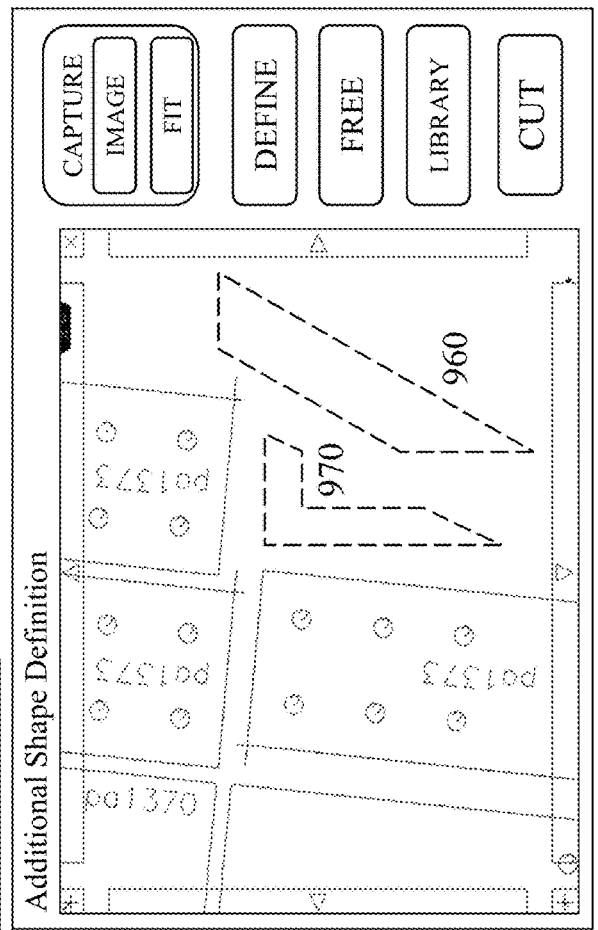

Now referring to FIGS. 9A and 9B there are depict first to fourth schematic images 900A to 900D respectively of an intuitive user interface for a user to perform part selection and manipulation for one-off processes with a CNC laser cutting system according to an embodiment of the invention. Accordingly, as depicted in first schematic image 900A the user is presented with an image 910 within which are depicted outlines 920 of piece-part(s) to be processed and/or already processed and has selected within the menu the option "Define" in order to select a piece-part to process Next in second schematic image 900B the user has selected within a pop-up window 930A, such as through one or more menus as known in the art, a template file comprising a plurality of piece-parts 940. Subsequently in third schematic image 900C the user has within the pop-up window 930B selected a single piece-part 940 and rotated it to rotated part 950. Subsequently, as depicted in fourth schematic image 900D the user has finished selecting and adjusting the piece-parts depicted as first and second parts 960 and 970 respectively.

Accordingly, the user is able to directly access templates to select piece-parts, manipulate them individually or in groups or in their entirety wherein these are then directly processed by the CNC machine. In this manner a user may rapidly and easily establish a single piece-part to process or establish and process multiple piece-parts upon a new work piece or upon a previously used work piece in order to reduce waste etc. The manipulations available to a user may be limited, for example, to translations and rotations in order to fit the piece-part to a work-piece such as depicted with first part 960. In other embodiments the user may be able to scale a piece-part in conjunction with other transformations as well as combine them with others, replicate, copy, paste etc. Hence, for example, the user may add bolt holes to first and second piece parts 960 and 970 respectively or overlap them wherein the combined profile is processed. Whilst the embodiments of the invention have been described through the user accessing templates and accordingly piece-parts codes with a descriptor language compatible with the numerical control (NC) systems, e.g. G-code (RS274), the piece-part may be imported from a non-NC format such as a drawing file (e.g. .DWG, DXF) or image file (e.g. JPEG, TIFF etc.).

Whilst the discussions presented supra in respect of FIGS. 1 to 9B have been primarily presented with respect to settings of laser welding and plasma cutting systems. However, it would be apparent to one of skill in the art that the methodologies may alternatively be associated with a tool rather than the machine or with respect to a consumable of a tool and/or machine. Further, these processes and methodologies may also be applied to range of other manufacturing processes and/or machines including, but not limited to, machining, milling, welding, cutting, forming, welding, and 3D printing with processes exploiting additive and/or removal processes such as plasma, laser, thermal, fluid etc.

For example, a user may access a template for welding a bracket and may manipulate the location(s) of weld(s) as well as adding/removing welds or modifying the length of a weld. In each instance that a user modifies an existing template the modified template may be stored as a new template. Within other embodiments of the invention the user may simply denote a location of a weld and the CNC system will execute a predetermined weld sequence established in dependence upon the piece-parts being welded as established, for example, by material, thickness, angle of piece-parts etc. Hence, the user may only define a spot or a line and the remainder is performed using the best process established by the CNC machine from its library and/or external libraries. In other instances, the CNC machine may communicate a request for a process to the manufacturer or a user community. Within embodiments of the invention standard process libraries may be updated such as described by the inventor within U.S. Provisional Patent Application 62/218,611 entitled "Client Initiated Vendor Verified Tool Setting."

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof. Databases as referred to herein may also refer to digital repositories of content or other digitally stored content within a collection which may be indexed or non-indexed.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    displaying to a user a view of a captured image of a workpiece either to be subjected to a process or subjected to a process by a computer numerical control (CNC) machine, wherein the captured image of the workpiece includes freehand marked lines on the workpiece indicating a shape and location of an added piece part;
    automatically replacing the freehand marked lines in the captured image with fitted lines at the location of the freehand marked lines corresponding to the added piece part on the workpiece; and
    upon receiving an indication for a process to be performed, adding the location to a processing sequence to be performed and executing the processing sequence with the CNC machine or a tool forming part of the CNC machine to thereby form a plurality of piece parts associated with said process, and form said added piece part at said location through additional processing with the CNC machine or the tool forming part of the CNC machine.

2. The method according to claim 1, wherein the tool is a plasma cutting torch.

3. The method according to claim 1, further comprising the steps of:
    presenting, to the user, an option to seek advice; and
    upon determining the user has selected the option to seek advice the CNC machine performs a process comprising the steps of:
        transmitting to the manufacturer of the CNC machine first data relating to the process to which the workpiece was subjected; and
        receiving from the manufacturer of the CNC machine second data relating to either another process to be performed upon the workpiece to re-work at least one of the plurality of piece parts or the added piece part or adjustments to the settings of the process for subsequent use by the CNC machine when executing that process.

4. The method according to claim 1, further comprising the steps of:
    presenting, to the user, an option to seek advice; and
    upon determining the user has selected the option to seek advice the CNC machine performs a process comprising the steps of:
        transmitting first data to a user community associated with the CNC machine, the first data comprising one or more of data relating to materials, process parameters, and item images.

5. The method according to claim 1, wherein said shape includes a curve and the captured image of the workpiece includes a marked indicator adjacent the curve, and the method further comprises the step of automatically recognizing the curve in the captured image based on the marked indicator.

6. The method of claim 1, further comprising the step of disregarding an additional marking on the workpiece as an added piece part based on a color of the additional marking.

7. A method comprising:
    displaying to a user a view of a captured image of a workpiece either to be subjected to a process or subjected to a process by a plasma cutting system, wherein the captured image of the workpiece includes freehand marked lines on the workpiece indicating a shape and location of an added piece part;
    automatically replacing the freehand marked lines in the captured image with fitted lines at the location of the freehand marked lines corresponding to the added piece part on the workpiece; and
    upon receiving an indication in relation to the workpiece prior to its being subjected to a process to be performed, adding the fitted lines to a processing sequence to be performed and executing the processing sequence with the plasma cutting system to thereby form a plurality of piece parts associated with said process, and form said added piece part at said location through additional processing with the plasma cutting system.

8. The method according to claim 7, further comprising the steps of:
    presenting, to the user, an option to seek advice; and
    upon determining the user has selected the option to seek advice the plasma cutting system performs a process comprising the steps of:
        transmitting to the manufacturer of the plasma cutting system first data relating to the process to which the workpiece was subjected; and
        receiving from the manufacturer of the plasma cutting system second data relating to either another process to be performed upon the workpiece to re-work at least one of the plurality of piece parts or the added piece part or adjustments to the settings of the process for subsequent use by the plasma cutting system when executing that process.

9. The method according to claim 7, further comprising the steps of:
    presenting, to the user, an option to seek advice; and
    upon determining the user has selected the option to seek advice the plasma cutting system performs a process comprising the steps of:
        transmitting first data to a user community associated with the plasma cutting system, the first data comprising one or more of data relating to materials, process parameters, and item images.

10. The method according to claim 7, wherein said shape includes a curve and the captured image of the workpiece includes a marked indicator adjacent the curve, and the method further comprises the step of automatically recognizing the curve in the captured image based on the marked indicator.

11. The method of claim 7, further comprising the step of disregarding an additional marking on the workpiece as an added piece part based on a color of the additional marking.

\* \* \* \* \*